US012475047B2

(12) United States Patent
Ishii et al.

(10) Patent No.: US 12,475,047 B2
(45) Date of Patent: Nov. 18, 2025

(54) FILTERING INVALIDATION REQUESTS (71) Applicant: Arm Limited, Cambridge (GB)

(72) Inventors: Yasuo Ishii, Austin, TX (US); Matthew Andrew Rafacz, Austin, TX (US); Guillaume Bolbenes, Antibes (FR); Houdhaifa Bouzguarrou, Valbonne (FR); . Abhishek Raja, Austin, TX (US)

(73) Assignee: Arm Limited, Cambridge (GB)

( * ) Notice: Subject to any disclaimer, the term of this patent is extended or adjusted under 35 U.S.C. 154(b) by 40 days.

(21) Appl. No.: 16/550,607

(22) Filed: Aug. 26, 2019

(65) Prior Publication Data

US 2021/0064528 A1    Mar. 4, 2021

(51) Int. Cl.
*G06F 12/08* (2016.01)
*G06F 12/0808* (2016.01)
*G06F 12/1027* (2016.01)

(52) U.S. Cl.
CPC ...... *G06F 12/0808* (2013.01); *G06F 12/1027* (2013.01); *G06F 2212/1016* (2013.01)

(58) Field of Classification Search
CPC ............ G06F 12/0808; G06F 12/1027; G06F 2212/1016; G06F 12/0833; G06F 12/08; G06F 12/1009; G06F 2212/65; G06F 2212/683
See application file for complete search history.

(56) References Cited

U.S. PATENT DOCUMENTS

| 4,142,234 | A | * | 2/1979 | Bean | G06F 12/0808 |
| | | | | | 711/121 |
| 7,552,255 | B1 | * | 6/2009 | George | G06F 12/1036 |
| | | | | | 710/52 |
| 2002/0087811 | A1 | * | 7/2002 | Khare | G06F 12/0817 |
| | | | | | 711/146 |
| 2005/0273575 | A1 | * | 12/2005 | Mukherjee | G06F 12/1027 |
| | | | | | 711/146 |
| 2006/0075147 | A1 | * | 4/2006 | Schoinas | G06F 12/1027 |
| | | | | | 710/22 |
| 2009/0210627 | A1 | * | 8/2009 | Alexander | G06F 9/3812 |
| | | | | | 711/125 |
| 2011/0072234 | A1 | * | 3/2011 | Chinya | G06F 12/121 |
| | | | | | 711/207 |
| 2014/0095807 | A1 | * | 4/2014 | Moll | G06F 12/0831 |
| | | | | | 711/146 |
| 2015/0242319 | A1 | * | 8/2015 | Evans | G06F 12/1036 |
| | | | | | 711/207 |
| 2016/0321182 | A1 | * | 11/2016 | Grubisic | G06F 12/1027 |
| 2016/0350220 | A1 | * | 12/2016 | Salisbury | G06F 12/0817 |
| 2017/0255557 | A1 | * | 9/2017 | Robinson | G06F 12/0815 |
| 2017/0371789 | A1 | * | 12/2017 | Blaner | G06F 12/1009 |

(Continued)

*Primary Examiner* — Tracy C Chan
(74) *Attorney, Agent, or Firm* — NIXON & VANDERHYE P.C.

(57) ABSTRACT

A data processing apparatus is provided. Cache circuitry caches data, the data being indexed according to execution contexts of processing circuitry. Receive circuitry receives invalidation requests each referencing a specific execution context in the execution contexts. Invalidation circuitry invalidates at least some of the data in the cache circuitry and filter circuitry filters the invalidation requests based on at least one condition and, when the condition is met, causes the invalidation circuitry to invalidate the data in the cache circuitry.

13 Claims, 7 Drawing Sheets

(56) References Cited

U.S. PATENT DOCUMENTS

| | | | |
|---|---|---|---|
| 2018/0088868 A1* | 3/2018 | Miller, Jr. | G06F 3/0619 |
| 2018/0089094 A1* | 3/2018 | Clancy | G06F 12/1063 |
| 2018/0225209 A1* | 8/2018 | Mannava | G06F 12/0811 |
| 2018/0349280 A1* | 12/2018 | Prasad | G06F 12/128 |
| 2018/0357178 A1* | 12/2018 | Mathewson | G06F 12/1458 |
| 2019/0034350 A1* | 1/2019 | Lemay | G06F 12/1009 |
| 2019/0163645 A1* | 5/2019 | Zeng | G06F 9/45558 |
| 2020/0110710 A1* | 4/2020 | Truelove | G06F 12/1036 |
| 2020/0167292 A1* | 5/2020 | Horsnell | G06F 9/544 |
| 2020/0371951 A1* | 11/2020 | Chatterjee | G06F 12/10 |

\* cited by examiner

FILTERING INVALIDATION REQUESTS

TECHNICAL FIELD

The present disclosure relates to data processing. More particularly, it relates to caches.

DESCRIPTION

Caches can be used to store data in association with a virtual address, as opposed to a physical address. This can be advantageous in situations where virtual addresses are used and it is undesirable, for efficiency reasons, to convert between physical and virtual addresses. A downside to using virtual addresses in this manner is that the mappings between virtual and physical addresses might become invalid. For instance, a virtual address might be relinquished and might therefore need to be invalidated. In such situations, it is possible to check each entry of the cache for matching virtual addresses. However, this can be time consuming and is inefficient. Another option is to flush the entire cache. But flushing the cache repeatedly makes it difficult to gain the benefits of the cache. This problem can become worse when a number of CPU cores exist within a system, since any such invalidation request may have to be shared between all the cores. Consequently, the presence of one core that repeatedly issues invalidations can have a negative performance impact on all the other cores. It is therefore desirable to improve the efficiency with which such cache maintenance operations can take place.

SUMMARY

Viewed from a first example configuration, there is provided a data processing apparatus comprising: cache circuitry to cache data, the data being indexed according to execution contexts of processing circuitry; receive circuitry to receive invalidation requests each referencing a specific execution context in the execution contexts; invalidation circuitry to invalidate at least some of the data in the cache circuitry; and filter circuitry to filter the invalidation requests based on at least one condition and, when the condition is met, to cause the invalidation circuitry to invalidate the data in the cache circuitry.

Viewed from a second example configuration, there is provided a data processing method comprising: caching data, the data being indexed according to execution contexts of processing circuitry; receiving invalidation requests each referencing a specific execution context in the execution contexts; invalidating at least some of the data in the cache circuitry; and filtering the invalidation requests based on at least one condition and, when the condition is met, causing the invalidation circuitry to invalidate the data in the cache circuitry.

Viewed from a third example configuration, there is provided a data processing apparatus comprising: means for caching data, the data being indexed according to execution contexts of processing circuitry; means for receiving invalidation requests each referencing a specific execution context in the execution contexts; means for invalidating at least some of the data in means for caching data; and means for filtering the invalidation requests based on at least one condition and for causing the invalidation circuitry to invalidate the data in the cache circuitry when the condition is met.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: cache circuitry to cache data, the data being indexed according to execution contexts of processing circuitry; receive circuitry to receive invalidation requests each referencing a specific execution context in the execution contexts; invalidation circuitry to invalidate at least some of the data in the cache circuitry; and filter circuitry to filter the invalidation requests based on at least one condition and, when the condition is met, to cause the invalidation circuitry to invalidate the data in the cache circuitry.

An execution context can be considered to be the environment in which a program or software executes. For example, the environment could relate to a particular virtual or physical machine, processor, processor core, or operating system (all of which are examples of the claimed processing circuitry). In these example configurations, the entries of the cache (e.g. the data in the cache) are tagged using at least the specific execution context associated with that data. Similarly, when invalidation requests are received, they reference a particular execution context. A filter is provided that provides a list of all of the execution contexts used as indexes in the cache. In this way, when an invalidation request is received, it can be filtered by the filter to determine whether it is relevant to the local cache. If the request is relevant, then the data in the cache is flushed. Otherwise, the request can be ignored. In this way, it is not necessary to scan through the entire cache to search for every entry that might match the invalidation request. Instead, as soon as there is a match in the filter, the invalidation request is deemed to be relevant and the data is flushed. Similarly, not every invalidation request causes the entire cache to be flushed since some invalidation requests can be disregarded based on the filter. In this way, even if a number of invalidation requests are received, such requests have a negative impact to the extent that those invalidation requests relate to the local cache, which in many cases will be none at all.

In some examples, the filter circuitry comprises storage circuitry having a given capacity to store a set of allowed contexts; and the condition comprises a requirement that the specific execution context referenced by the invalidation requests matches at least one of the allowed contexts. The filter circuitry stores a number of allowed contexts in storage circuitry. In practice, the set of allowed contexts can be determined from the contexts listed in the cache circuitry. The filtering of the invalidation request is carried out on the basis of the allowed contexts. In particular, the filtering requires that the execution context referenced in the invalidation request matches at least one of the allowed contexts in the storage circuitry of the filter circuitry. The filter circuitry is therefore able to filter invalidation requests based on contexts that are stored in the storage circuitry of the filter circuitry. Consequently, contexts that are not relevant to the cache circuitry are disregarded.

In some examples, when one of the invalidation requests is received and the specific execution context referenced by that one of the invalidation requests matches the at least one of the allowed contexts, the filter circuitry causes the invalidation circuitry to invalidate the data in the cache circuitry. The filtering is therefore such that in order for the invalidation request to have an effect, it must refer to an execution context that is one of the allowed contexts in the storage circuitry of the filter circuitry.

In some examples, the data processing apparatus comprises an overflow indicator to indicate when the given capacity is at least met. The overflow indicator could be a bit whose value indicates when the given capacity is met (or exceeded). For instance, the overflow indicator could have the value '1' when the given capacity is met and could have a value '0' if the capacity is not met. Of course, it will be appreciated that the opposite is possible as well. The bit may form part of a larger register that could, for instance, provide a status on a number of different elements of the data processing apparatus.

In some embodiments, when one of the invalidation requests is received and the overflow indicator indicates that the given capacity is at least met, the filter circuitry causes the invalidation circuitry to invalidate the data in the cache circuitry. Consequently, when the capacity of the storage circuitry of the filter circuitry is met, then any received invalidation request causes the data in the cache circuitry to be invalidated regardless of the context referred to in that invalidation request. This has the effect, over time, of reducing the number of invalidation requests that have an effect on the cache circuitry. For instance, if the storage circuitry of the filter circuitry contains a number of different contexts such that the storage circuitry of the filter circuitry is at capacity, then this will trigger a future invalidation request to cause the cache circuitry and the storage circuitry of the filter circuitry to be invalidated. Going forwards, new entries to the cache circuitry will have the corresponding contexts inserted into the storage circuitry of the filter circuitry. Thus, any old contexts that were previously stored in the storage circuitry of the filter circuitry will no longer have any effect. Effectively, this process offers a "clean slate" regarding the set of execution contexts that can cause the data in the cache circuitry to be invalidated.

In some examples, the data processing apparatus comprises fill circuitry to add a new context to the allowed contexts in the storage circuitry in response to the new context being added to the cache circuitry. The addition of a new context to the cache circuitry causes that context to be added to the storage circuitry of the filter circuitry. Furthermore, the removal of entries from the cache circuitry may cause the corresponding removal of those contexts from the filter circuitry's storage circuitry.

In some examples, when the new context is received and the given capacity is at least met, the filter circuitry selects one of the allowed contexts as a victim context, removes the victim context from the allowed contexts and causes the invalidation circuitry to selectively invalidate those of the data corresponding with the victim context. Eventually, the storage circuitry of the filter circuitry may reach its capacity. At this time, in these examples, one of the allowed contexts in the storage circuitry of the filter circuitry is selected. A number of different techniques may be used in order to select such a 'victim'. Such examples include least-recently-used and round-robin. Having selected a victim, the victim is replaced by the new context that is to be added. Meanwhile, entries in the cache circuitry that correspond with the victim are invalidated. Other entries of the cache circuitry remain. Such an approach provides an alternative to the "clean slate" approach previously described. In these examples, the entire cache is not invalidated as a consequence of the storage circuitry of the filter circuity meeting its capacity. A consequence of this is that it is less likely that the cache circuitry will have to be completely invalidated. This reduces the performance penalties that otherwise occur when the cache must be flushed. On the other hand, this necessitates performing a search of the cache circuitry to invalidate specific entries once the filter circuitry's storage circuitry reaches capacity. This process can be time consuming or can be costly in terms of hardware.

In some examples, the execution contexts comprise one or more of: address specifier ID, virtual machine ID, and privilege level. There are many ways of representing the execution context. The address specifier ID indicates a particular application or item of software that is executing on the machine. A virtual machine ID indicates a virtualised environment as may be provided to a virtual machine running on the system. A privilege level indicates the level of privilege under which the processing circuitry operates. Accordingly, such execution contexts make it possible to uniquely identify an application running on a particular virtual machine and, by means of the execution level, the manner in which the application is being executed.

In some examples, the processing circuitry is a processor core in a multi-core system. Within such a system, each of the cores may communicate with each other via a bus. Each core may have a number of dedicated resources that can only be used by that core. For instance, each core may have its own Translation Look Aside Buffer (TLB), and a level one cache. However, each of the cores may also share certain resources such as a main memory (DRAM).

In some examples, the invalidation requests originate from a different processor core in the multi-core system. An invalidation request may originate from a different processor core in a multi-core system as a consequence of that core having to invalidate the mapping between a virtual address and a physical address. In such a system, the translations between the virtual address and the physical address could theoretically reside in cache structures at any of the other cores in the multi-core system. Consequently, the invalidation requests are typically broadcast using the communication bus to which the cores are connected.

In some examples, the invalidation requests indicate that a mapping between a virtual address and a physical address is invalid; and the data in the cache circuitry is additionally indexed by virtual addresses. Such an example of cache circuit would be a Virtual Indexed Virtual Tagged (VIVT) cache.

In some examples, the cache circuitry is a Translation Lookaside Buffer. A Translation Lookaside Buffer (TLB) is a type of cache used to store translations from virtual addresses to physical addresses. Such a cache makes use of virtual addresses, and consequentially can be sensitive to invalidation requests that make reference to those virtual addresses.

In some examples, the cache circuitry comprises an instruction cache. An instruction cache is used to quickly fetch and/or modify instructions rather than having to retrieve or store such instructions in main memory. In some situations, an instruction cache could be indexed using a virtual address. This can be efficient since it makes it possible to access the instruction cache without having to perform translation between virtual addresses and physical addresses if, for instance, the program counter references virtual addresses. Such a technique can improve the efficiency of the system and makes it possible for instructions to be obtained from the instruction cache more quickly. However, such techniques must be able to react to changes in respect of the virtual addresses such as changes between the mappings between virtual and physical addresses. Note that there is no obligation for the cache to provide a direct translation between a virtual address and an instruction. In particular, the cache circuitry may provide a number of different circuits each of which provides a different stage of the translation. For instance, the cache circuitry could include a first structure in order to provide a translation from a virtual address to a physical address, and a second structure to provide a conversion from the physical address to the cached instruction. Other techniques are of course possible.

In some examples, the cache circuitry comprises an operation cache. In some architectures, an instruction can be degenerated into one or more operations. Furthermore, the operations may be further degenerated into macro/micro operations. Indeed, the degeneration may involve a number of different levels. For instance, instructions could degenerate into operation, which degenerate into macro operations, which degenerate into micro operations. In such examples, the cache circuitry has an operation cache that caches one or more of the operations corresponding to a particular instruction. These operations could be full operations, macro operations, micro operations, or a combination thereof. Again, there is no obligation for the cache circuitry to provide a direct translation from a virtual address to an operation. This process may be carried out over a number of translations and using a number of different circuits, each of which may perform translation implicitly or explicitly.

Particular embodiments will now be described with reference to the figures.

Figure 1:
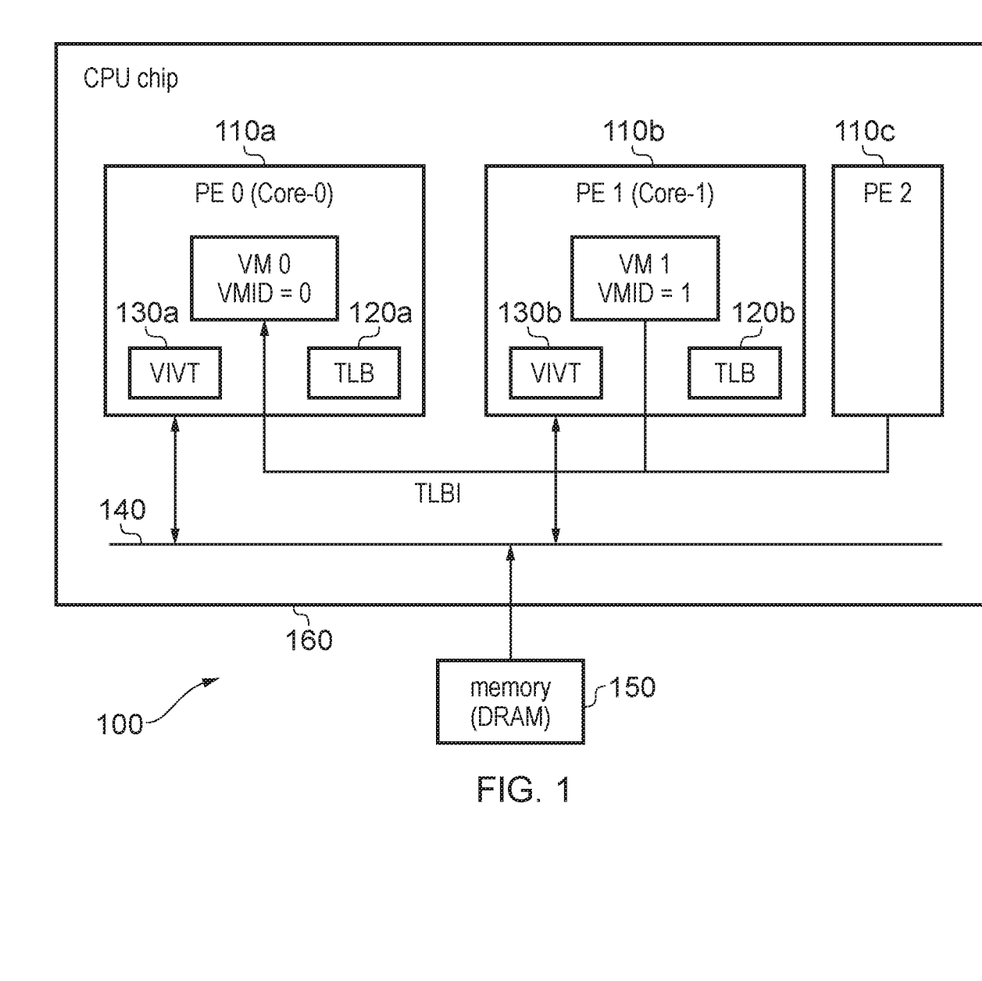
FIG. 1 shows a system comprising a number of cores that exchange invalidation requests in accordance with some embodiments.

FIG. 1 illustrates a system 100 including a CPU chip 160, the chip 160 comprising a number of processor cores 110a, 110b, 110c in accordance with some embodiments. At least some 110a, 110b of the processor cores comprise a Virtually Indexed Virtually Tagged (VIVT) cache 130, together with a Translation Lookaside Buffer 120, both of which are examples of the claimed cache circuitry. Each of the cores 110a, 110b, 110c communicates via a bus 140 to which a memory (DRAM) 150 is connected. In this way, each of the processor cores 110a, 110b, 110c can communicate amongst themselves as well as access the memory 150. In response to one of the cores 110b changing a mapping from a particular virtual address to a physical address (which might happen at process creation or during page swapping if the physical memory capacity is not enough to cover all the processes), it is necessary for an invalidation request (TLBI) to be issued to other cores 110a, 110c within the system 100 in relation to the virtual address. This is because any of the other cores 110a, 110c could have cached information relating to that virtual address. Consequently, that cached information must also be invalidated.

Also shown in FIG. 1 are the Virtual Machine Identifiers (VMIDs) associated with two of the cores 110a, 110b. The VMIDs form art of an execution context in which software may execute. Particular entries of the VIVT 130, and TLB 120 may be indexed using the execution context identifier. This makes it possible to provide a greater degree of control over the behaviour of the VIVT 130 and TLB 120. In particular, the use of an execution context identifier can provide access control to the data in the caches.

In these examples the TLBI request comprises an execution context identifier and a reference to a virtual address. On receiving a TLBI request, each of the cores 110a, 110b, 110c searches its VIVT 130 and TLB 120 for entries matching the execution context and virtual address references. Such caches 120, 130 may have a large number of entries and so checking each of these sequentially can be time consuming, which is undesirable. Another option would be to simply invalidate the entirety of the VIVT 130 and TLB 120 in response to a TLBI request. This has the advantage that it is not necessary to scan through all entries of the caches 120, 130 for matches. However, this causes a performance penalty each time a TLBI is received. Furthermore, each of the cores 110a, 110b, 110c is dependent on the behaviour of the other cores 110a, 110b, 110c. In particular, if one of the cores 110c repeatedly issues TLBIs then other cores 110a, 110b will be forced to repeatedly clear their caches 120, 130. In this case, it will be difficult for each of the cores 110a, 110b, 110c to make effective use of their caches. As more cores are added to the system, the likelihood of any one core issuing a TLBI increases.

Figure 2:
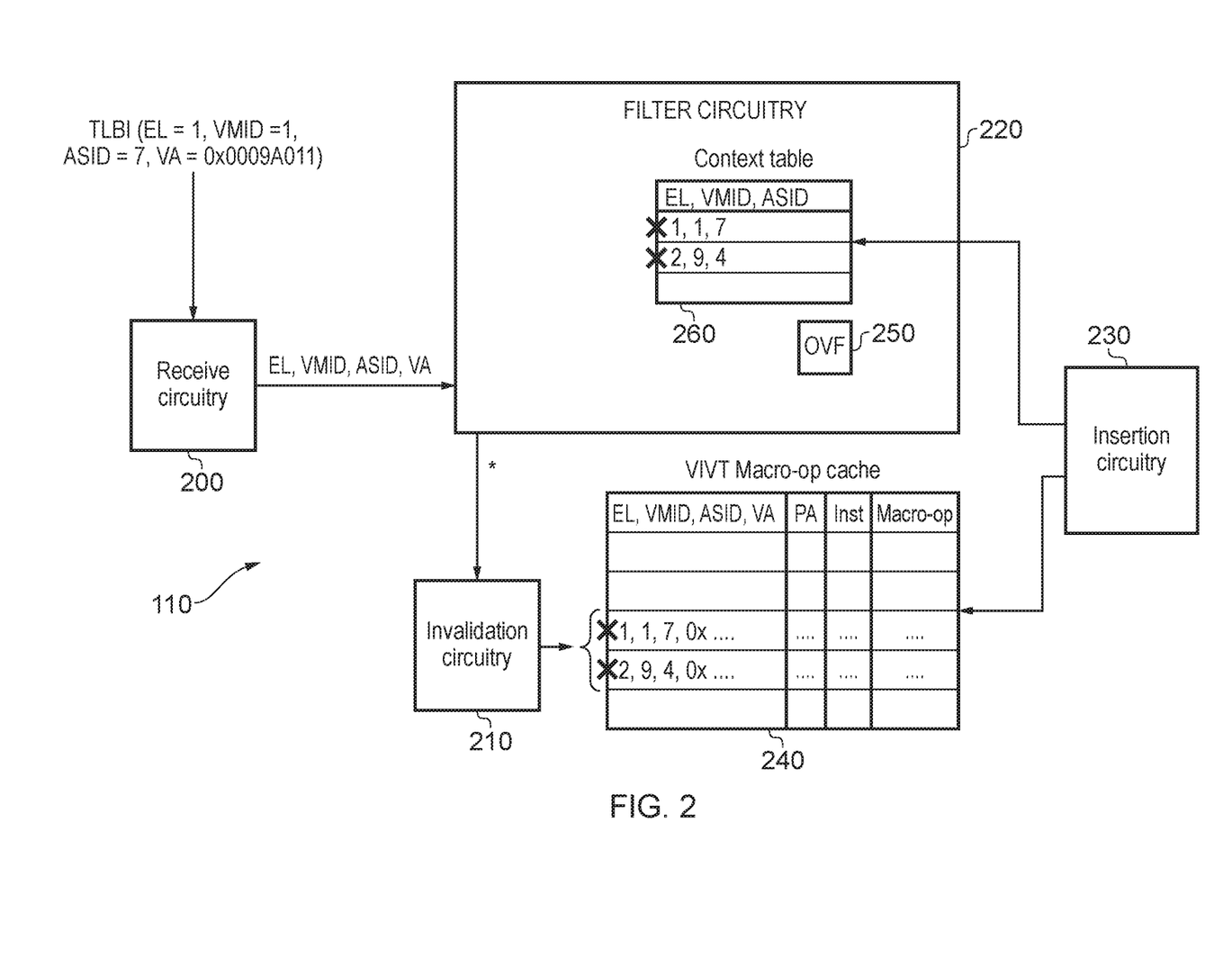
FIG. 2 illustrates an example of a core in accordance with some embodiments.

FIG. 2 illustrates a core 110 in accordance with some embodiments. The core 110 of this example includes filter circuitry 220, which is used to filter incoming TLBIs. In this example, the execution context referenced in the TLBI has an Execution Level (EL) of 1, a Virtual Machine Identifier (VMID) of 1, and an Address Space Identifier (ASID) of 7. The TLBI also makes reference to a virtual address of 0x0009A011. This TLBI is received by receive circuitry 200. The virtual address and the execution context data is sent to the filter circuitry 220. Here, the context is searched against entries in a context table 260 to determine whether there is match. The context table 260 is expected to be substantially smaller than either the VIVT or the TLB and to only contain one entry for each unique execution context. Hence, the searching is expected to proceed quickly. Furthermore, the filter circuitry 220 only determines whether there is a match or not. Consequently, once a match has been found, the search of the context table 260 can be halted.

If there is no match, then the TLBI is discarded, since it has no relevance to the current core 110. Otherwise, the invalidation circuitry 210 is used to invalidate the entries in the cache 240 (e.g. a VIVT or TLB). In this example, the cache 240 takes the form of a VIVT macro-op cache. This is illustrated as a single table for convenience, since the exact structure of the table is not relevant to the present technique. In practice, however, such a VIVT macro-op cache 240 could be made up of a number of tables that reference each other, with some of the data being implicitly provided.

In any event, by virtue of the filter 220, only TLBIs that relate to the cache 240 are able to invalidate the contents of that cache 240. As such, if another core repeatedly issues TLBIs then those TLBIs will only have an effect on the cache 240 of another core to the extent that the cache 240 happens to contain entries that are relevant to the TLBI. Furthermore, every time the cache 240 is invalidated, any stale or old entries are removed. Consequently, new entries that are added are expected to be more likely to be relevant to a current state of the processor core 110. This also makes it less likely that future TLBIs would get through the filter 220.

Insertions into the cache 240 are controlled by insertion circuitry 230. At the same time as inserting an entry into the cache 240, the insertion circuitry 230 also enters the execution context identifier into the context table 260 of the filter circuitry 220 if it is not already present.

Since the context table 260 provides the set of distinct execution context identifiers in the cache 240, when the cache 240 is invalidated, the entries in the context table 260 are also removed.

An overflow register 250 is also provided that indicates when the capacity of the context table 260 has been reached. This behaviour of the system when an overflow occurs is illustrated in more detail with respect to FIG. 4.

Figure 3:
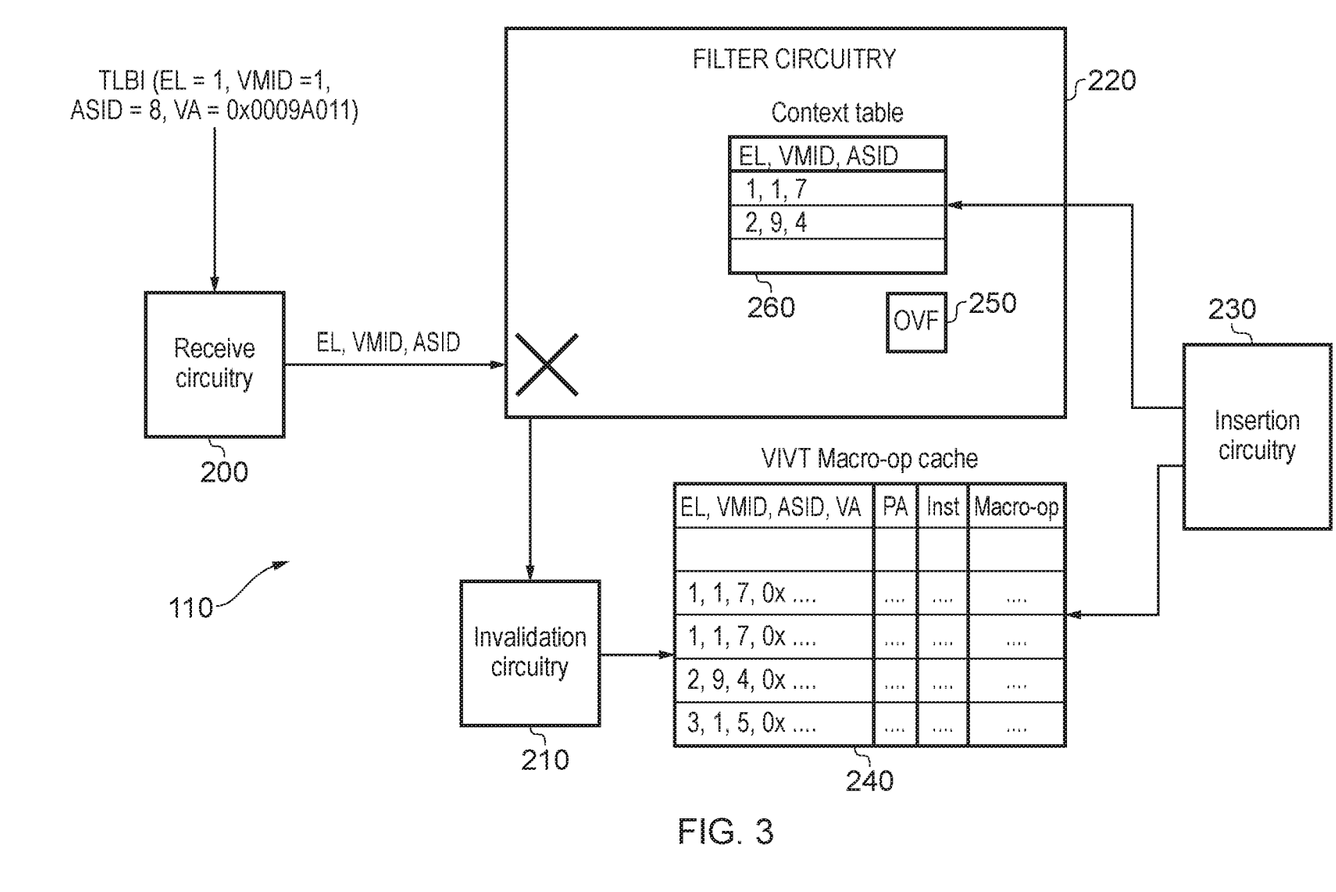
FIG. 3 illustrates an example of a core in accordance with some embodiments.

FIG. 3 illustrates an example in which there is no match at the context table 260 for an execution environment referenced in a TLBI request. In this example, the context referred to in the TLBI has an execution level of 1, a VMID of 1, and an ASID of 8. These are passed along to the filter circuitry 220. In this example, the context table does not include a matching execution context. In particular, in the first of the two entries, the ASID does not match since the ASID of the first entry in the context table 260 is a 7, whereas the ASID in the TLBI is an 8. In the case of the second of the two entries, none of the execution level, VMID, or ASID match. Consequently, the TLBI is discarded. Therefore, no use of the invalidation circuitry 210 takes place, and the cache 240 is not invalidated.

Figure 4:
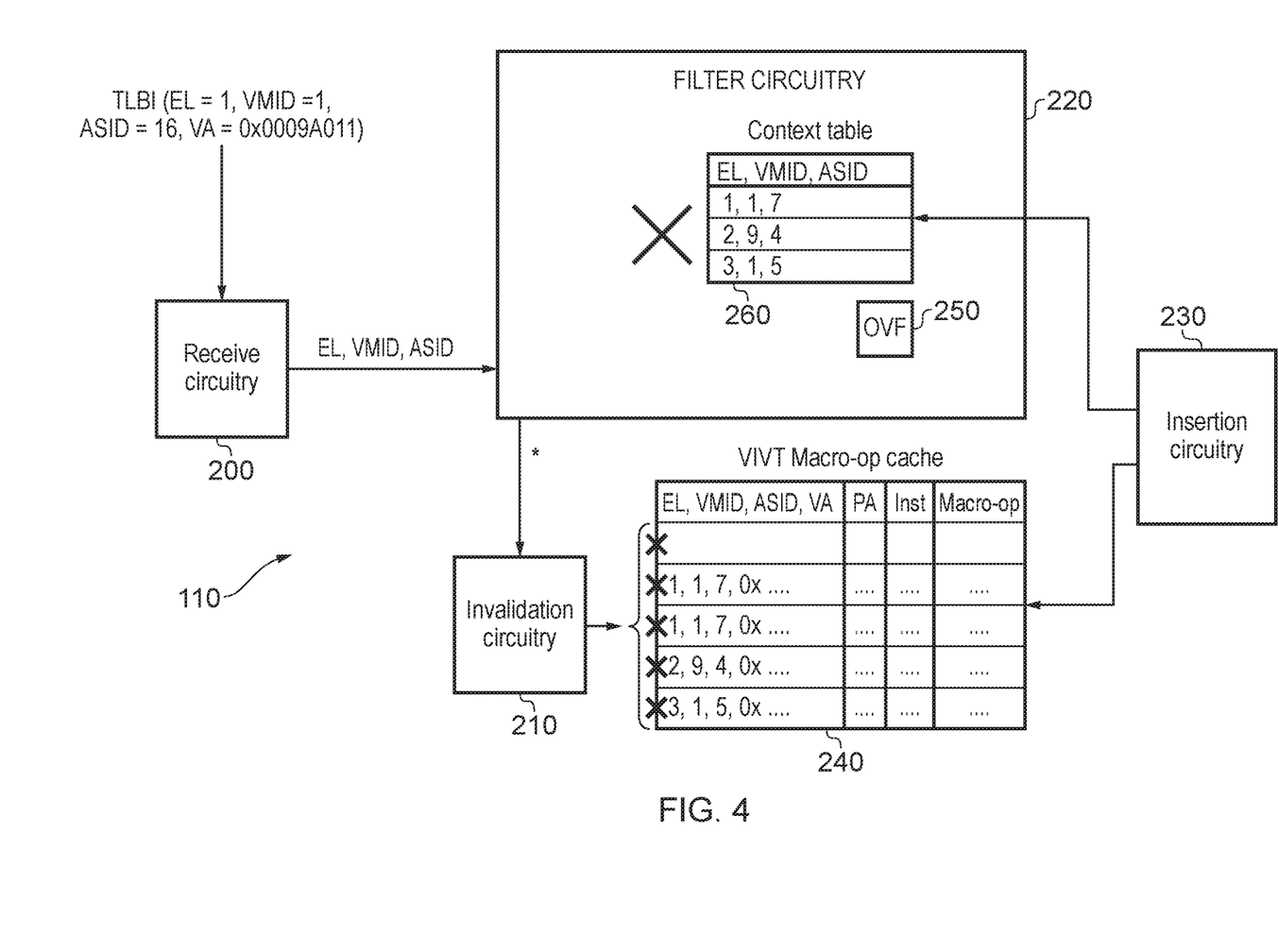
FIG. 4 illustrates an example of a core and a response to the filter circuitry becoming full in accordance with some embodiments.

FIG. 4 illustrates an example of receiving a TLBI when the overflow register 250 indicates that the context table 260 is at capacity. In this example, the execution environment referred to in the TLBI is not present in any of the entries of the context table 260. However, since the overflow indicator 250 indicates that the context table 260 is at capacity, the receiving of the TLBI causes the invalidation circuitry 210 to be invoked anyway. In this case, the invalidation circuitry 210 invalidates all entries of the cache 240 and by extension, the context table itself 260. In this way, when the cache 240 refers to so many different contexts that the context table 260 reaches its capacity, then any TLBI request causes the VIVT table 240 to be invalidated. This provides a "clean slate" so that the cache 240 can be built up again. This can be useful to help illuminated old contexts and to reduce the number of different contexts that are provided within the VIVT 240.

Figure 5:
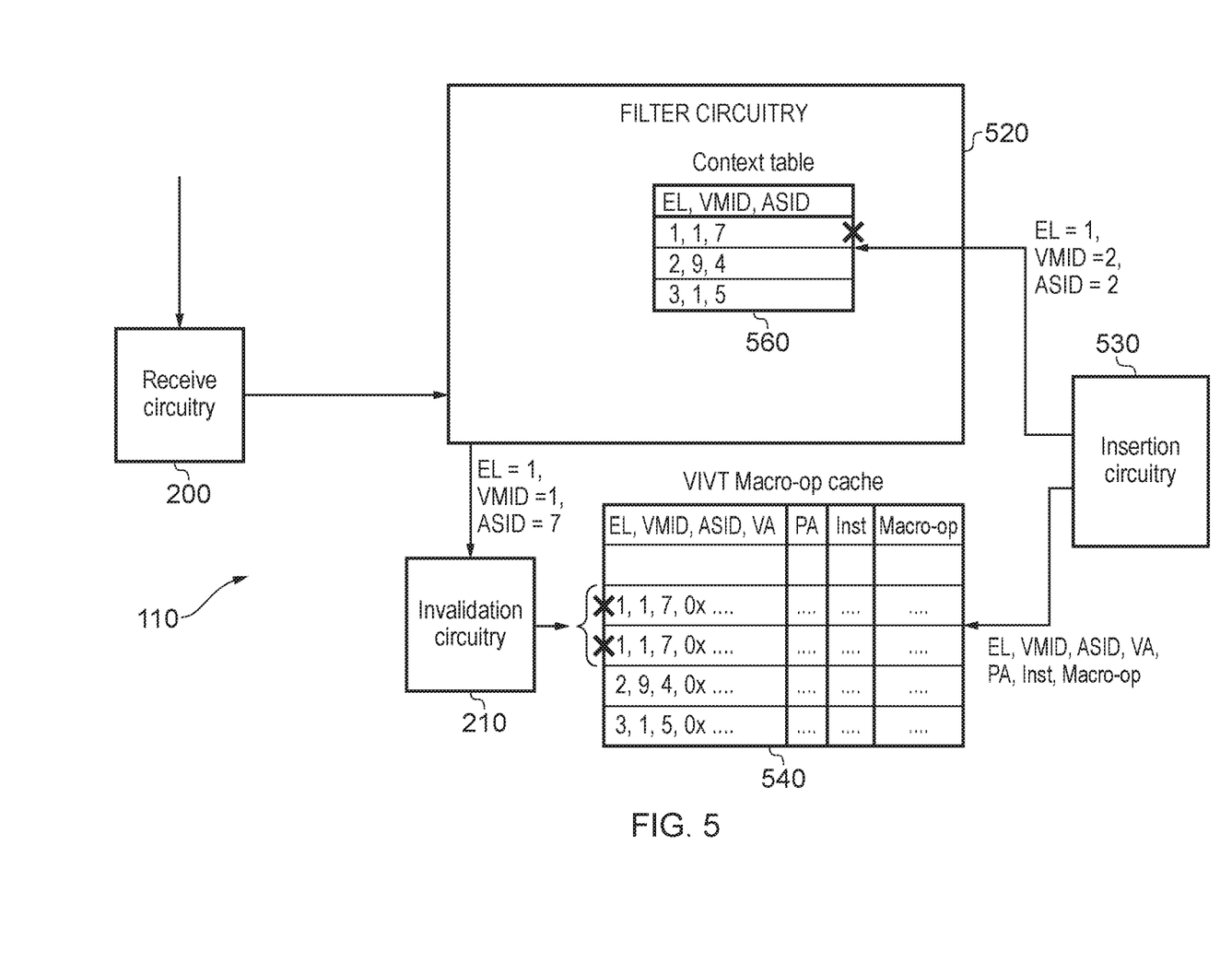
FIG. 5 illustrates an example of a core and a response to the filter circuitry becoming full in accordance with some embodiments.

FIG. 5 shows an alternative method of responding to the context table 560 reaching capacity. In this example, overflow is handled at the time of insertion. In particular, in this example the insertion circuitry 530 seeks to add a new execution context identifier having an execution level of 1, a VMID of 2, and an ASID of 2. Since the context table 560 is at capacity, a victim is selected from the context table 560. In this example, the first entry (having an EL of 1, VMID of 1, and ASID of 7) is selected. The invalidation circuitry 210 is invoked with these parameters. Consequently, the invalidation circuitry 210 invalidates all entries in the cache 540 matching the requested execution context. The victim line in the context table 560 is then replaced with the new execution context identifier being provided by the insertion circuitry 530.

In this way, the capacity of the context table 560 is not extended but is instead responded to by replacing an entry of the context table 560 and removing any matching entries from the cache 540. The context table 560 therefore remains at capacity after having selected a victim. There is no specific manner in which a victim entry must be chosen. In some embodiments the selection may take place randomly, for instance.

This approach has the advantage that less data is lost from the cache 540 as a consequence of the context table 560 reaching capacity. A disadvantage to this system is that when the capacity of the context table 560 is reached, then each time an insertion is to occur, the invalidation circuitry 210 must scan through the entirety of the cache 540 looking for matching entries to invalidate. This situation does not improve, since as previously explained, the capacity problem of the context table 560 is not alleviated. Therefore, future TLBIs must also perform the same search procedure.

Figure 6:
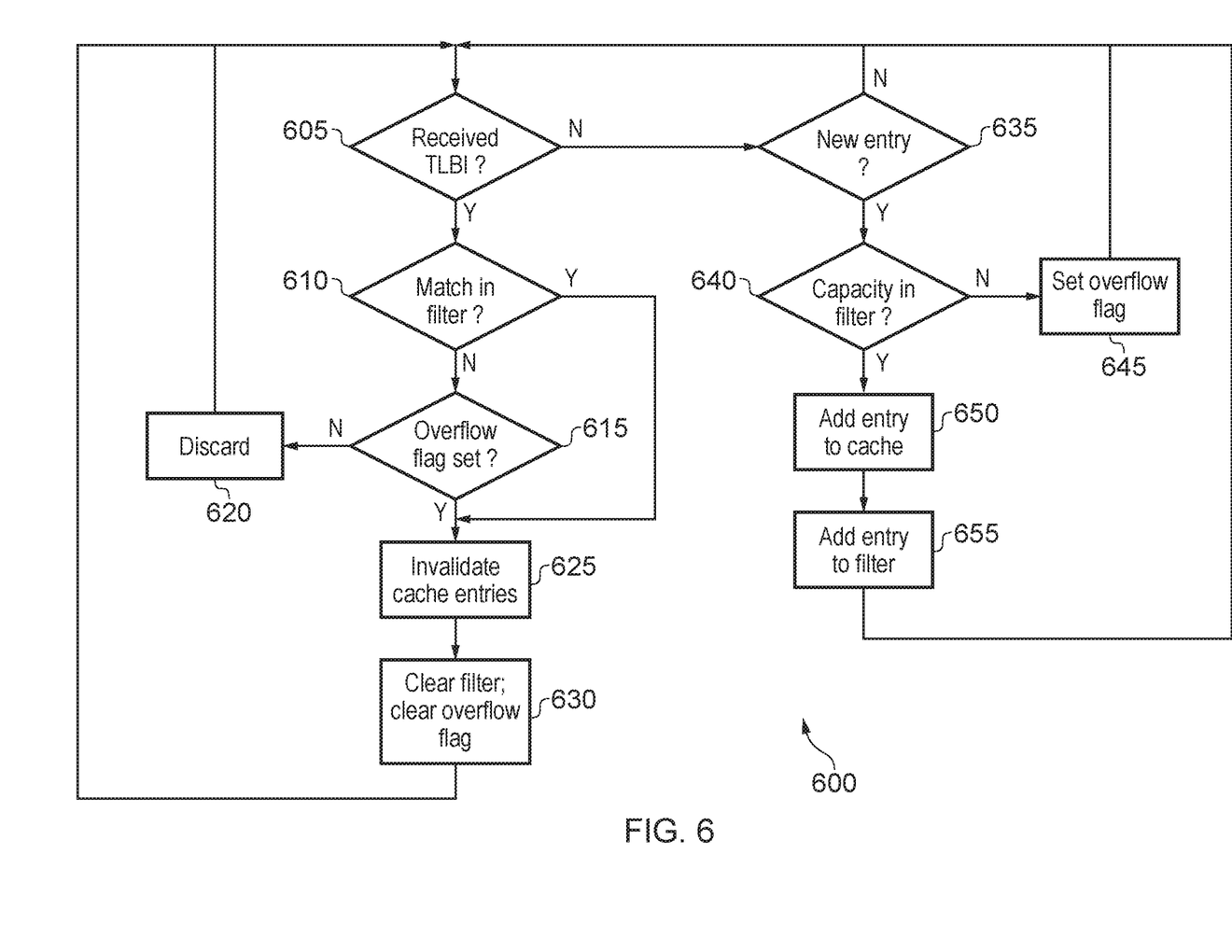
FIG. 6 shows a flowchart that illustrates a method of data processing in accordance with some embodiments.

FIG. 6 illustrates a flow chart 600 showing the behaviour of the core in accordance with the examples illustrated in FIGS. 2, 3 and 4. The process begins at a step 605, where it is determined whether a TLBI has been received. If so, then at step 610, it is determined whether a match occurs at the filter circuitry. If not, then it is determined at step 615 whether the overflow flag in the overflow register is set. If not, then the TLBI is discarded at step 620, and the process returns to step 605. If so, or if a match occurs in the filter at step 610, then the process proceeds to step 625 where cache entries in the cache circuitry (such as a VIVT and/or TLBI) are invalidated. At step 630, the filter is then cleared by invalidating the entries in the context table, and the overflow flag is cleared. The process then returns to step 605.

If, at step 605, a TLBI has not been received, then at step 635, it is determined whether a new entry is to be added. If not, then the process returns to step 605. If so, then at step 640, it is determined whether there is capacity available in the context table of the filter. If not, then at step 645, the overflow flag is set and the entry is not added. The process then returns to step 605. If, at step 640 it is determined that there is capacity in the filter, then the entry is added to the cache at step 650 and at step 655, a corresponding entry comprising the identification of the execution context is added to the context table of the filter. The process then returns to step 605.

Figure 7:
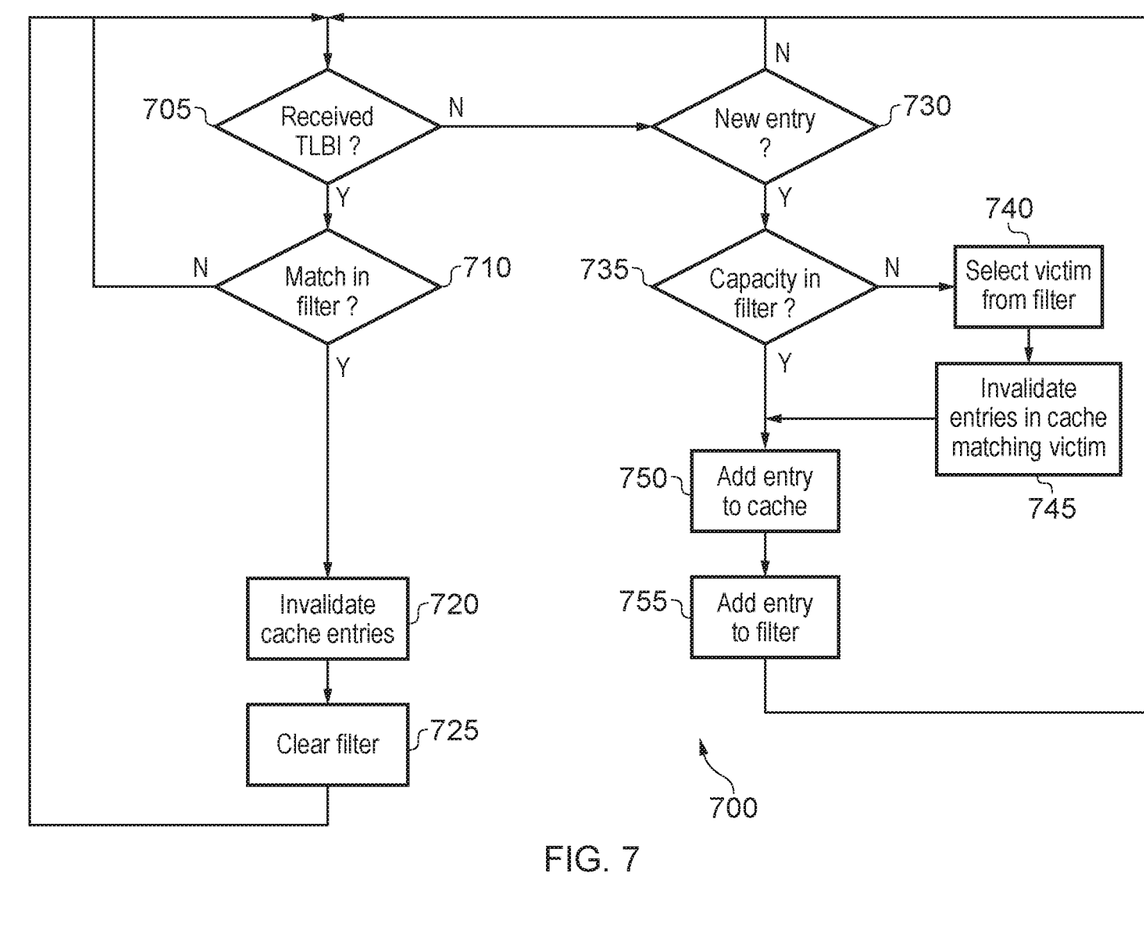
FIG. 7 shows a flowchart that illustrates a method of data processing in accordance with some embodiments.

FIG. 7 illustrates a flow chart that shows the behaviour of the core as illustrated in FIGS. 2, 3 and 5. In this example, the processor starts at step 705 where it is determined whether a TLBI has been received. If so, then at step 710, it is determined whether there is a match in the filter circuitry. In particular, it is determined whether the context provided in the TLBI matches one of the contexts provided in the context table. If not, then the process returns to step 705. Alternatively, if there is match, then at step 720, each of the entries of the cache is invalidated. At step 725, the context table in the filter is cleared. The process then returns to step 705. If, at step 705, a TLBI has not been received, then the process proceeds to step 730 where it is determined whether a new entry is to be added. If not, then the process returns to step 705. If so, then at step 735, it is determined whether there is capacity in the context table of the filter. If not, then at step 740 a victim is selected from the context table of the filter. Based on that victim, at step 745, selective invalidation of the cache occurs. The process then proceeds to step 750, which is also the following step if there is capacity in the filter at step 735. At step 750, the new entry is added to the cache, and at step 755, the new entry is added to the context table of the filter. The process then returns to step 705.

Accordingly, it has been demonstrated how it is possible to respond to invalidation requests in such a manner that the invalidation request can be responded to promptly. Furthermore, the behaviour of cores that submit excessive numbers of invalidation requests need not have a significantly large negative impact on other cores.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   cache circuitry configured to cache data, the data being indexed according to execution contexts of processing circuitry which are environments of the processing circuitry in which programs execute;
   receive circuitry configured to receive, from an alternative processing circuitry different from the processing circuitry, invalidation requests each specifying a specific execution context in the execution contexts;
   invalidation circuitry configured to invalidate at least some of the data in the cache circuitry; and
   filter circuitry configured to cause the invalidation circuitry to invalidate the at least some of the data in the cache circuitry when the specific execution context specified by one of the invalidation requests matches at least one of a set of allowed execution contexts stored in the filter circuitry, wherein
   the at least some of the data comprises at least one entry of the cache circuitry which is not indicated by the specific execution context provided in the one of the invalidation requests and at least one entry of the cache circuitry which is indicated by the specific execution context provided in the one of the invalidation requests;
   the invalidation circuitry is configured to invalidate the at least some of the data without searching the cache circuitry when at least one of the following is true:
      the one of the invalidation requests that the filter circuitry has determined matches the at least one of the set of allowed execution contexts, and
      a capacity of the filter circuitry is at least met,
   otherwise the invalidation circuitry is configured to disregard the one of the invalidation requests; and
   the capacity of the filter circuitry is smaller than a capacity of the cache circuitry.

2. The data processing apparatus according to claim 1, wherein
   when one of the invalidation requests is received and the specific execution context referenced by that one of the invalidation requests matches the at least one of the allowed execution contexts, the filter circuitry causes the invalidation circuitry to invalidate the data in the cache circuitry.

3. The data processing apparatus according to claim 1, comprising:
   fill circuitry to add a new execution context to the allowed execution contexts in the storage circuitry in response to the new execution context being added to the cache circuitry.

4. The data processing apparatus according to claim 1, wherein
   when the new execution context is received and the given capacity is at least met, the filter circuitry selects one of the allowed execution contexts as a victim context, removes the victim context from the allowed execution contexts and causes the invalidation circuitry to selectively invalidate those of the data corresponding with the victim context.

5. The data processing apparatus according to claim 1, wherein
   the execution contexts comprise one or more of: address specifier ID (ASID), virtual machine ID, and privilege level.

6. The data processing apparatus according to claim 1, wherein
   the processing circuitry is a processor core in a multi-core system.

7. The data processing apparatus according to claim 6, wherein
   the invalidation requests originate from a different processor core in the multi-core system.

8. The data processing apparatus according to claim 1, wherein
   the invalidation requests indicate that a mapping between a virtual address and a physical address is invalid; and
   the data in the cache circuitry is additionally indexed by virtual addresses.

9. The data processing apparatus according to claim 1, wherein
   the cache circuitry is a Translation Lookaside Buffer.

10. The data processing apparatus according to claim 1, wherein
    the cache circuitry comprises an instruction cache.

11. The data processing apparatus according to claim 1, wherein
    the cache circuitry comprises an operation cache.

12. A data processing method comprising:
    caching data in cache circuitry, the data being indexed according to execution contexts of processing circuitry which are environments of the processing circuitry in which programs execute;
    receiving, from an alternative processing circuitry different from the processing circuitry, invalidation requests each specifying a specific execution context in the execution contexts;
    invalidating at least some of the data in the cache circuitry;
    storing a set of allowed execution contexts in filter circuitry;
    causing the at least some of the data in the cache to be invalidated when the specific execution context specified by one of the invalidation requests matches at least one of the set of allowed execution contexts, wherein
    the at least some of the data comprises at least one entry of the cache circuitry which is not indicated by the specific execution context provided in the one of the invalidation requests and at least one entry of the cache circuitry which is indicated by the specific execution context provided in the one of the invalidation requests;

the at least some of the data in the cache is invalidated without searching the cache circuitry when at least one of the following is true:
  the one of the invalidation requests that the filter circuitry has determined matches the at least one of the set of allowed execution contexts, and
  a capacity of the filter circuitry is at least met,
otherwise the one of the invalidation requests is disregarded; and
the capacity of the filter circuitry is smaller than a capacity of the cache circuitry.

13. A data processing apparatus comprising:
means for caching data, the data being indexed according to execution contexts of processing circuitry which are environments of the processing circuitry in which programs execute;
means for receiving, from an alternative processing circuitry different from the processing circuitry, invalidation requests each specifying a specific execution context in the execution contexts;
means for invalidating at least some of the data in means for caching data; and
means for storing a set of allowed execution contexts;
means for causing the at least some of the data in the means for caching data to be invalidated when the specific execution context specified by one of the invalidation requests matches at least one of a set of allowed execution contexts, wherein
the at least some of the data comprises at least one entry of the means for caching data which is not indicated by the specific execution context provided in the one of the invalidation requests and at least one entry of the cache circuitry which is indicated by the specific execution context provided in the one of the invalidation requests;
the at least some of the data in the means for caching data is invalidated without searching the means for caching data when at least one of the following is true:
  the one of the invalidation requests that the means for causing has determined matches the at least one of the set of allowed execution contexts, and
  a capacity of the means for causing is at least met,
otherwise the one of the invalidation requests is disregarded; and
the capacity of the means for causing is smaller than a capacity of the cache circuitry.

* * * * *